(12) United States Patent
Tsai

(10) Patent No.: US 8,991,007 B2
(45) Date of Patent: Mar. 31, 2015

(54) DOUBLE BRAKE STRUCTURE FOR CASTER WHEEL

(71) Applicant: Po-Chuan Tsai, Tainan (TW)

(72) Inventor: Po-Chuan Tsai, Tainan (TW)

( * ) Notice: Subject to any disclaimer, the term of this patent is extended or adjusted under 35 U.S.C. 154(b) by 0 days.

(21) Appl. No.: 13/964,232

(22) Filed: Aug. 12, 2013

(65) Prior Publication Data

US 2015/0040352 A1    Feb. 12, 2015

(51) Int. Cl.
*B60B 33/00* (2006.01)

(52) U.S. Cl.
CPC .................................. *B60B 33/0084* (2013.01)
USPC ........................................................ 16/35 R

(58) Field of Classification Search
USPC .......... 16/35 R, 35 D, 37, 38, 31 R; 188/1.12, 188/30, 31, 72.9, 69; 280/5.2, 5.24, 5.26, 280/47.17, 5.22, 47.29, 47.38, 47.22, 642, 280/647, 650, 651, 652, 43
See application file for complete search history.

(56) References Cited

U.S. PATENT DOCUMENTS

| | | | | |
|---|---|---|---|---|
| 5,988,323 A * | 11/1999 | Chu | ............................ | 188/1.12 |
| 6,360,851 B1 * | 3/2002 | Yang | ............................ | 188/1.12 |
| 6,532,624 B1 * | 3/2003 | Yang | ............................ | 16/35 R |
| 7,516,512 B2 * | 4/2009 | Tsai | ............................ | 16/35 R |
| 7,707,686 B2 * | 5/2010 | Chou | ............................ | 16/35 R |
| 7,930,802 B2 * | 4/2011 | Tsai | ............................ | 16/35 R |
| 8,499,413 B1 * | 8/2013 | Tsai | ............................ | 16/35 R |
| 2010/0170061 A1 * | 7/2010 | Lin | ............................ | 16/47 |
| 2010/0175222 A1 * | 7/2010 | Fallshaw et al. | ............. | 16/35 R |
| 2011/0010892 A1 * | 1/2011 | Von Bordelius et al. | ..... | 16/35 R |

* cited by examiner

*Primary Examiner* — Chuck Mah
(74) *Attorney, Agent, or Firm* — Che-Yang Chen; Law Office of Michael Chen

(57) ABSTRACT

A double brake structure for a caster wheel contains a body, a connecting shaft, a cover, a central post, two rollers, a locking piece, a fixing member, a braking seat, a resilient element, and a bottom cap. The body includes a groove having a square hole and includes a receiving chamber. The locking piece includes a retaining recess for limiting a peripheral rib of the cover. The fixing member includes two engaging teeth, two through holes, a flange, a notch, and a recessed trench. The braking seat includes an opening, a tab extending, and a pedal portion. The bottom cap includes a pore defined thereon and a circular indention formed on a central position of a top surface thereof so as to insert one end of the resilient element.

2 Claims, 12 Drawing Sheets

DOUBLE BRAKE STRUCTURE FOR CASTER WHEEL

FIELD OF THE INVENTION

The present invention relates to a double brake structure for a caster wheel which is capable of stopping two rollers and a connecting shaft simultaneously.

BACKGROUND OF THE INVENTION

As shown in FIG. 11, a conventional double brake structure for a caster wheel 2 contains a pressing member 23 pressed downwardly so as to stop two rollers, wherein when the pressing member 23 is pressed, an end portion 231 of the pressing member 23 rotates along a tangent angle 241 of a sliding holder 24, and the end portion 231 pushes the sliding block 24 to press a resilient element 27 by using a long peripheral fringe 232, a fixing pin 25 moves to abut against a recess 211 of a body 21 along an elongated hole 201 of a seat 20, thus stopping the body 21 movement. In addition, a locking block 26 is pushed by an elastic member 28 to move with the sliding block 24, such that the locking block 26 retains in a notch 222 of a projection 221 of a rotary shaft 22, hence the seat 20 is fixed so that the caster wheel 2 cannot roll and rotate.

Referring further to FIG. 12, another conventional caster wheel with double braking functions contains a pressing member 30, when the pressing member 30 is pressed, an pushing end 301 of the pressing member 30 is biased against a pushing block 31, and then the pushing block 31 moves downwardly along a groove 32, in the meantime, an abutting face 311 of the pushing block 31 pushes a tilted contacting face 331 of a sliding seat 33 so that the sliding seat 33 presses a first spring 34 horizontally, such that a fixing pin 332 of the sliding seat 33 retains in one of two recesses 41 of two rollers 4, and the two rollers 4 cannot rotate, thereafter a ball 36 in an orifice 35 is forced by a shoulder 333 of the sliding seat 33 so as to move upwardly to press a second spring 37 in the orifice 35, hence an extension 381 of a stopping post 38 engages with one of positioning holes 392 of a fix member 391 of a rotary column 39, thus stopping the rotary column 39 rotation.

The present invention has arisen to mitigate and/or obviate the afore-described disadvantages.

SUMMARY OF THE INVENTION

The primary object of the present invention is to provide a double brake structure for a caster wheel which is capable of stopping two rollers and a connecting shaft simultaneously.

To obtain the above objectives, double brake structure for a caster wheel contains: a body, a connecting shaft, a cover, a central post, two rollers, a locking piece, a fixing member, a braking seat, a resilient element, and a bottom cap.

The body includes a groove defined on one side thereof so as to insert the connecting shaft, and the groove has a square hole formed on one side thereof so as to insert the locking piece, the body also includes a receiving chamber arranged on another side thereof so as to receive the braking seat and includes an orifice.

The locking piece includes a retaining recess defined on a top end thereof so as to limit a peripheral rib of the cover.

The fixing member includes two engaging teeth disposed on two sides thereof, two through holes formed below the two engaging teeth so as to insert two pegs of the two rollers, a flange arranged on a top end of an inner wall thereof, a notch aside the flange, and a recessed trench defined on a left side thereof so as to position a bottom end of the locking piece.

The braking seat includes an opening formed on the end portion thereof so as to inert the central post, a tab extending downwardly from the end portion, and a pedal portion fixed on one end thereof.

The bottom cap includes a pore defined thereon and a circular indention formed on a central position of a top surface thereof so as to insert one end of the resilient element.

DETAILED DESCRIPTION OF THE PREFERRED EMBODIMENTS

Figure 1:
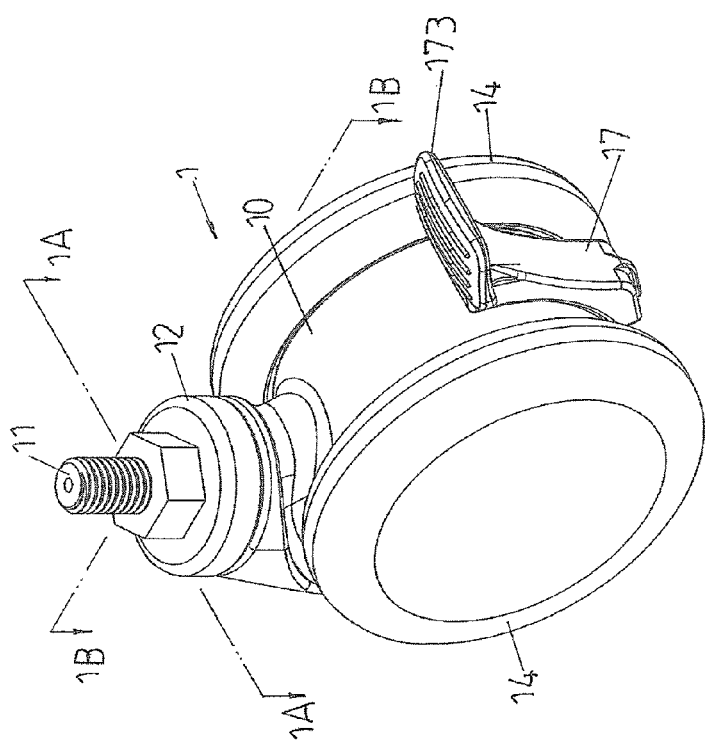
FIG. 1 is a perspective view showing the assembly of a double brake structure for a caster wheel according to a preferred embodiment of the present invention.
Figure 2:
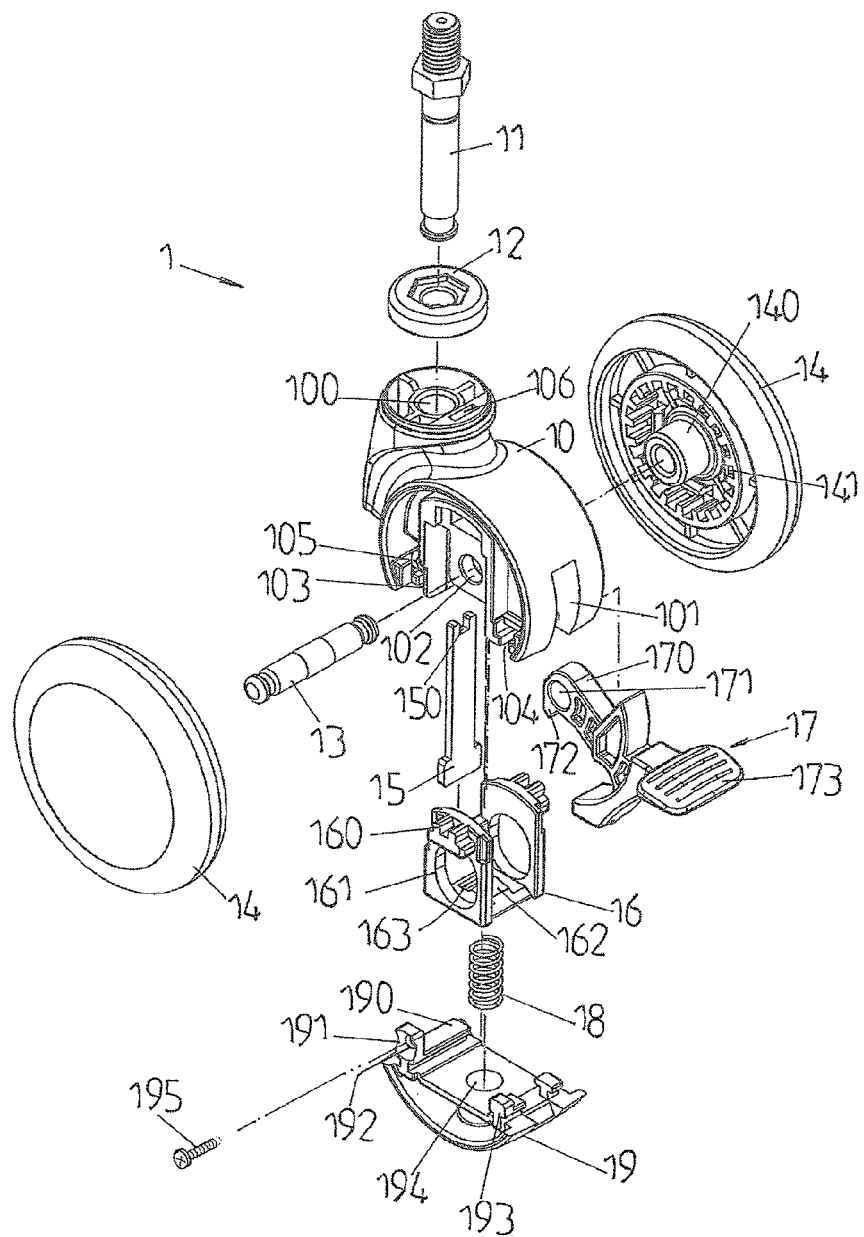
FIG. 2 is a perspective view showing the exploded components of the double brake structure for the caster wheel according to the preferred embodiment of the present invention.
Figure 3:
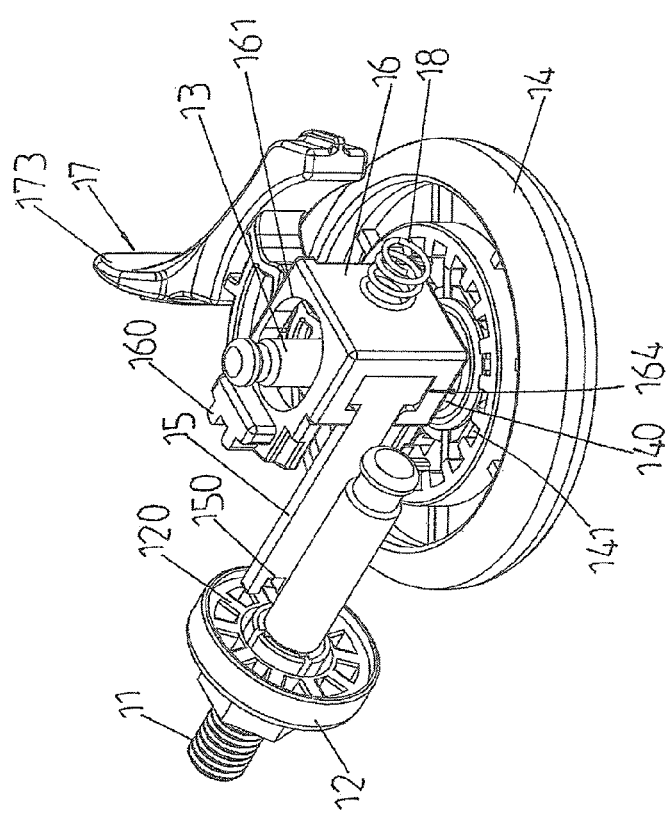
FIG. 3 is a perspective view showing the assembly of a part of the double brake structure for the caster wheel according to the preferred embodiment of the present invention.
Figure 4:
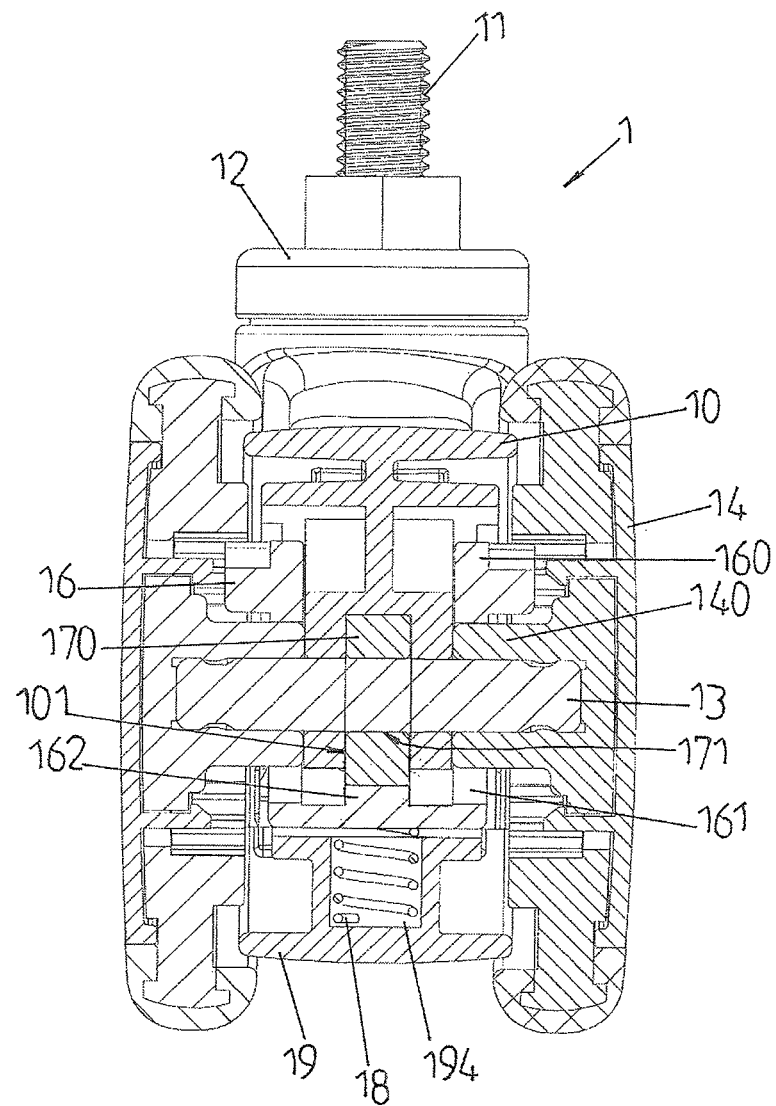
FIG. 4 is a cross sectional view taken along the line 1A-1A of FIG. 1.
Figure 5:
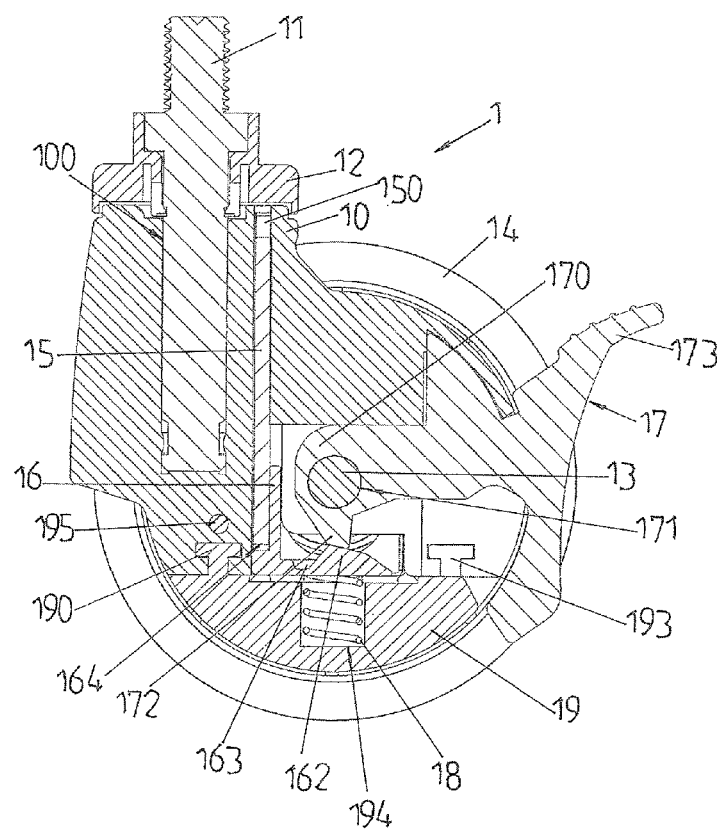
FIG. 5 is a cross sectional view taken along the line 1B-1B of FIG. 1.
Figure 6:
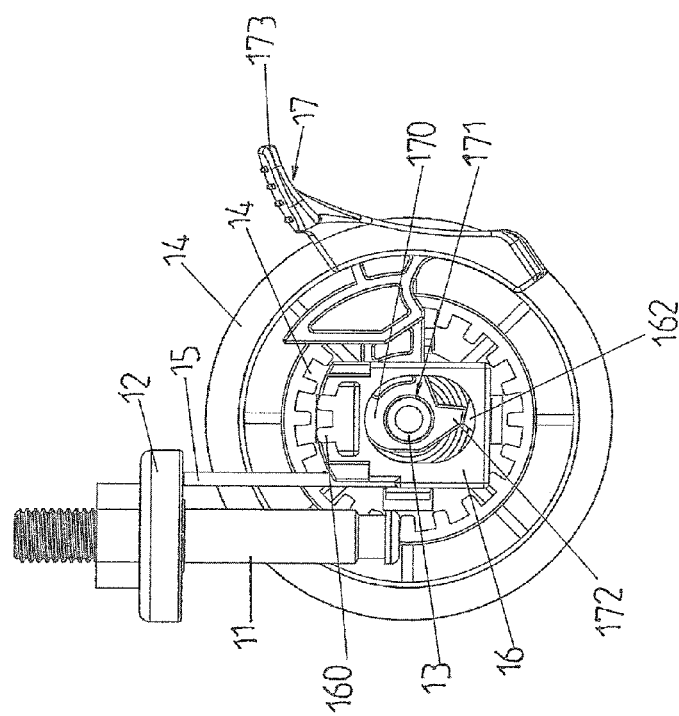
FIG. 6 is a plan view showing the assembly of a part of the double brake structure for the caster wheel according to the preferred embodiment of the present invention.

With reference to FIGS. 1-6, a double brake structure for a caster wheel 1 according to a preferred embodiment of the present invention comprises: a body 10, a connecting shaft 11, a cover 12, a central post 13, two rollers 14, a locking piece 15, a fixing member 16, a braking seat 17, a resilient element 18, and a bottom cap 19.

The body 10 includes a groove 100 defined on one side thereof so as to insert the connecting shaft 11, and the groove 100 has a square hole 106 formed on one side thereof so as to insert the locking piece 15. The body 10 also includes a receiving chamber 101 arranged on a central position of a lower end of another side thereof so as to receive an end portion 170 of the braking seat 17, and the receiving chamber 101 communicates with an orifice 102 of the body 10. The body 10 further includes two slots 103, 104 defined on two sides of a bottom end thereof so as to fix the bottom cap 19, wherein a slot 103 has a threaded aperture 105; the locking piece 15 is formed in an inverted T shape and includes a retaining recess 150 defined on a top end thereof; the fixing member 16 is formed in a U shape and includes two engaging teeth 160 disposed on two sides thereof, two through holes 161 formed below the two engaging teeth 160 so as to insert two pegs 140 of the two rollers 14, a flange 162 arranged on a top end of an inner wall thereof, a notch 163 aside the flange 162, and a recessed trench 164 defined on a left side thereof so as to position a bottom end of the locking piece 15; the braking seat 17 includes an opening 171 formed on the end portion 170 thereof so as to inert the central post 13, a tab 172 extending downwardly from the end portion 170, and a pedal portion 173 fixed on one end thereof; the bottom cap 19 includes a first inserting rim 190 extending vertically along a top end of one side thereof, a shoulder 191 extending upwardly along a front end of the first inserting rim 190, a pore 192 defined on a central position of the shoulder 191, two second inserting rims 193 disposed on a top end of another side thereof, and a circular indention 194 formed on a central position of a top surface thereof so as to insert one end of the resilient element 18.

In assembly, the connecting shaft 11 is inserted into the groove 100 of the body 10 via the cover 12 so that the cover 12 is covered on a top end of the body 10, such that the locking piece 15 is inserted into the square hole 106 of the body 10, and the bottom end of the locking piece 15 is mounted in the recessed trench 164 of the fixing member 16 so that the end portion 170 of the braking seat 17 is placed in the receiving chamber 101, and the opening 171 of the end portion 170 is aligned with the orifice 102 of the body 10, hence the central post 13 is inserted through the two through holes 161 of the fixing member 16, the orifice 102 of the body 10, and the opening 171 of the braking seat 17 to connect with the two rollers 14, and the two pegs 140 of the two rollers 14 are secured in the two through holes 161 of the fixing member 16, wherein the tab 172 of the end portion 170 of the braking seat 17 abuts against the flange 162 of the fixing member 16; and one end of the resilient element 18 pushes against a bottom end of the fixing member 16, another end of the resilient element 18 is mounted in the circular indention 194 of the bottom cap 19 so that the first inserting rim 190 and the second inserting rim 193 of the bottom cap 19 are inserted in the two slots 103, 104 of the body 10, hence the pore 192 of the shoulder 191 of the bottom cap 19 aligns with the threaded aperture 105 of the body 10 so as to assemble the double brake structure of the caster wheel 1 by means of a screwing element 195. It is to be noted that the resilient element 18 is in a compression state, and the two rollers 14 and the connecting shaft 11 roll and rotate.

Figure 7:
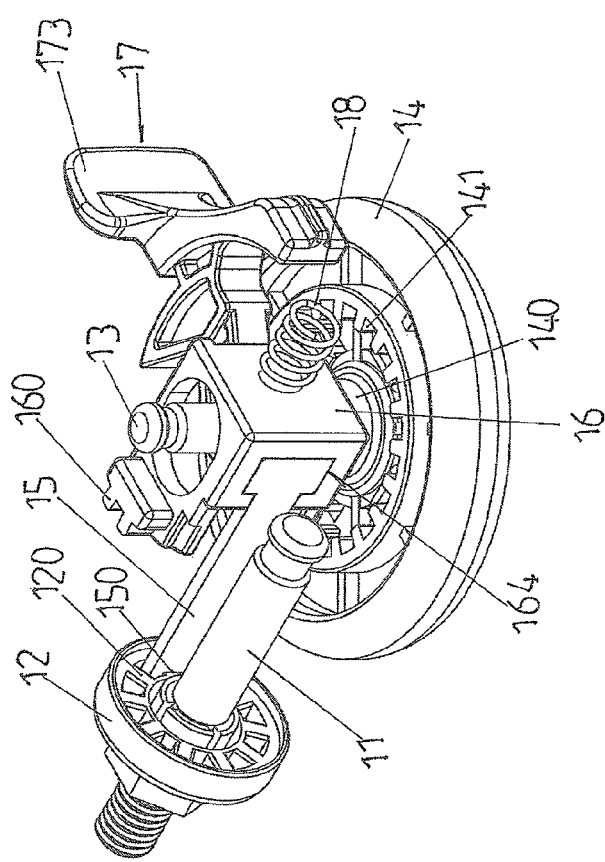
FIG. 7 is a perspective view showing the operation of a part of the double brake structure for the caster wheel according to the preferred embodiment of the present invention.
Figure 8:
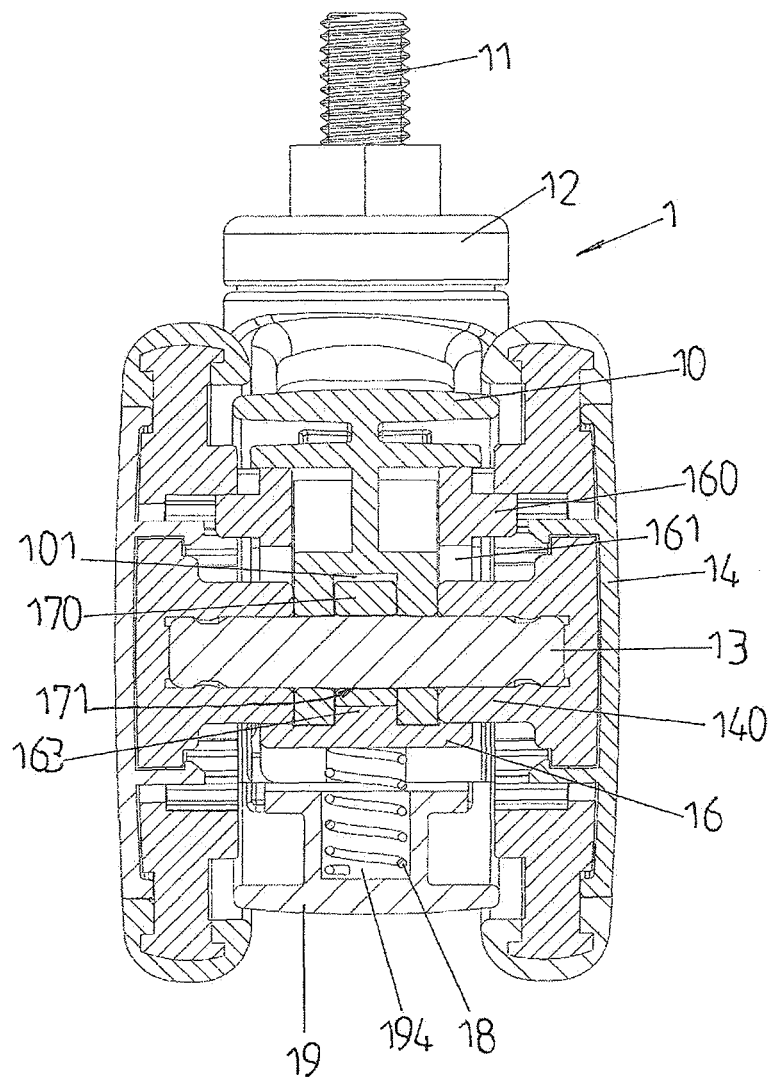
FIG. 8 is a cross sectional view showing the operation of a part of the double brake structure for the caster wheel according to the preferred embodiment of the present invention.
Figure 9:
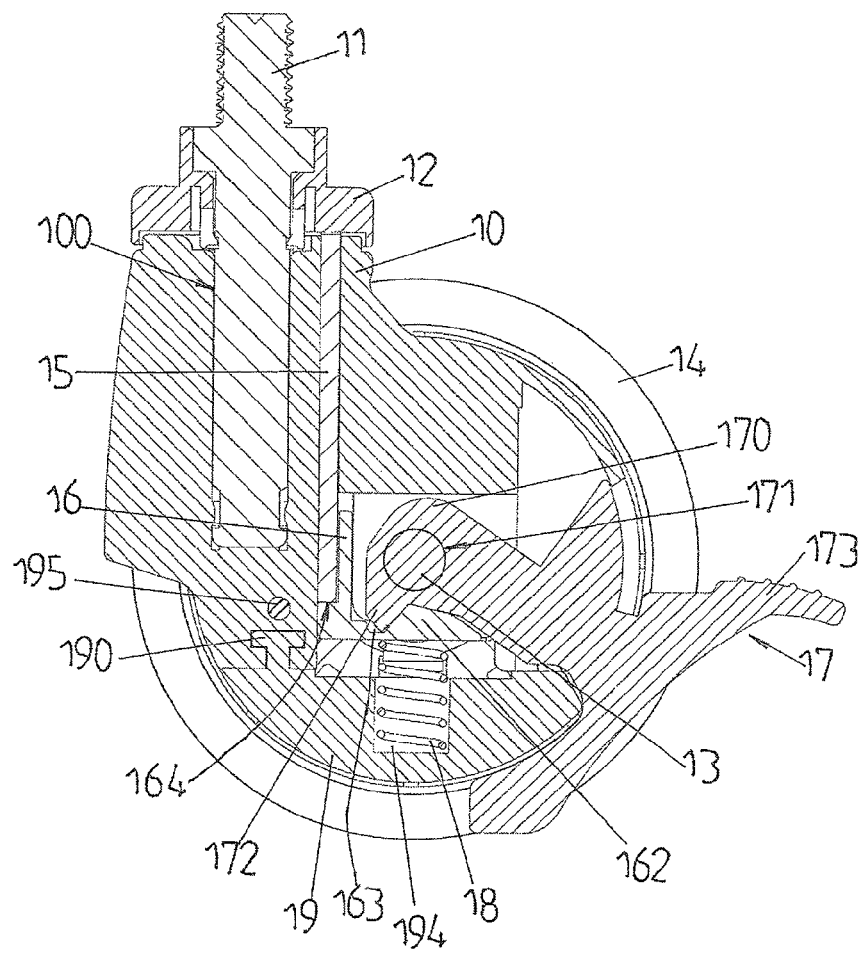
FIG. 9 is a cross sectional view showing the operation of another part of the double brake structure for the caster wheel according to the preferred embodiment of the present invention.
Figure 10:
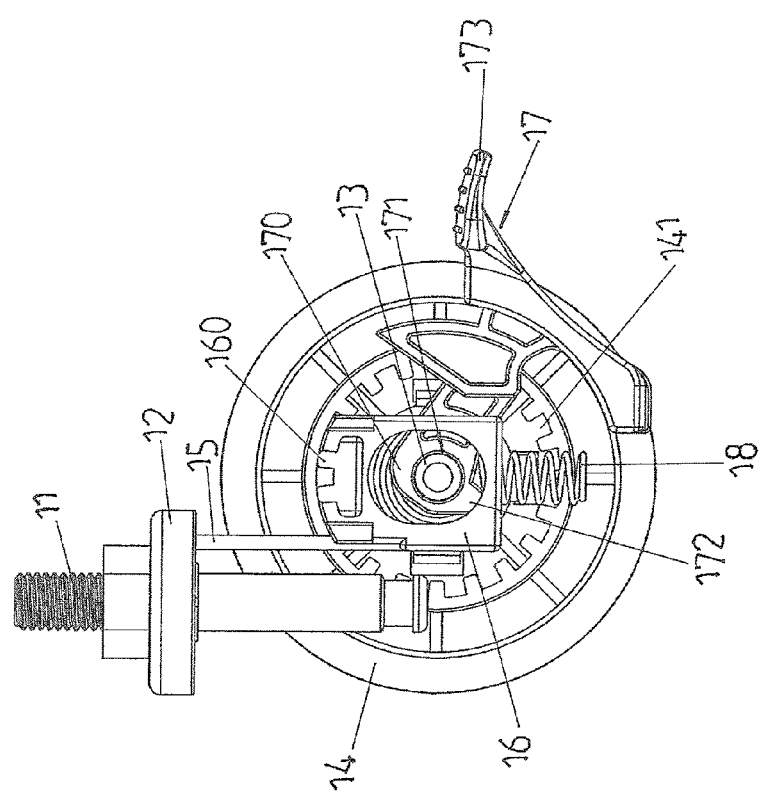
FIG. 10 is a plan view showing the operation of a part of the double brake structure for the caster wheel according to the preferred embodiment of the present invention.
Figure 11:
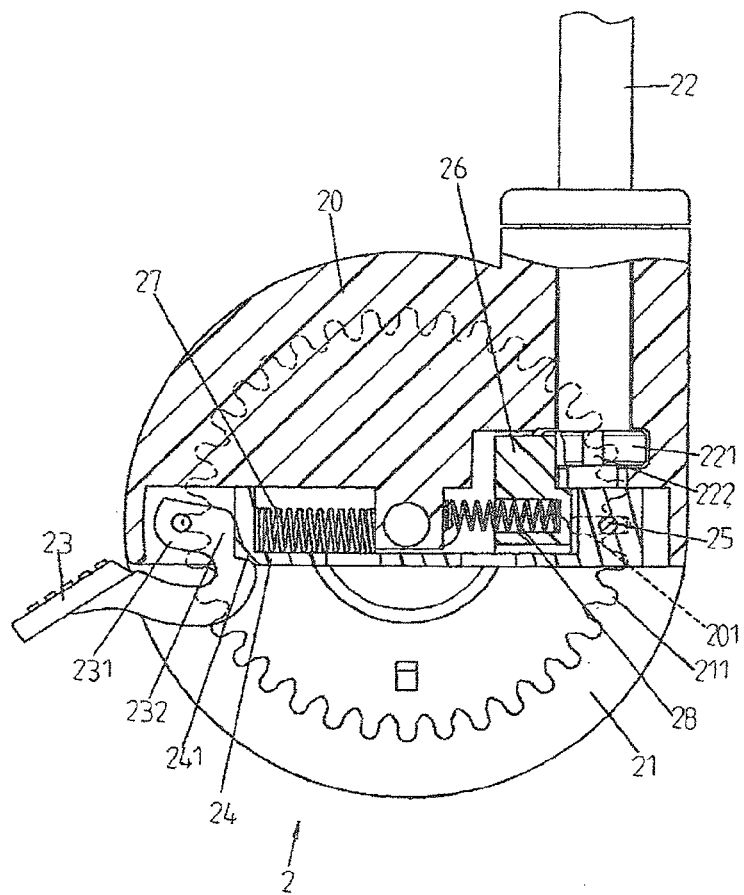
FIG. 11 is a cross sectional view showing the operation of a conventional double brake structure for the caster wheel.
Figure 12:
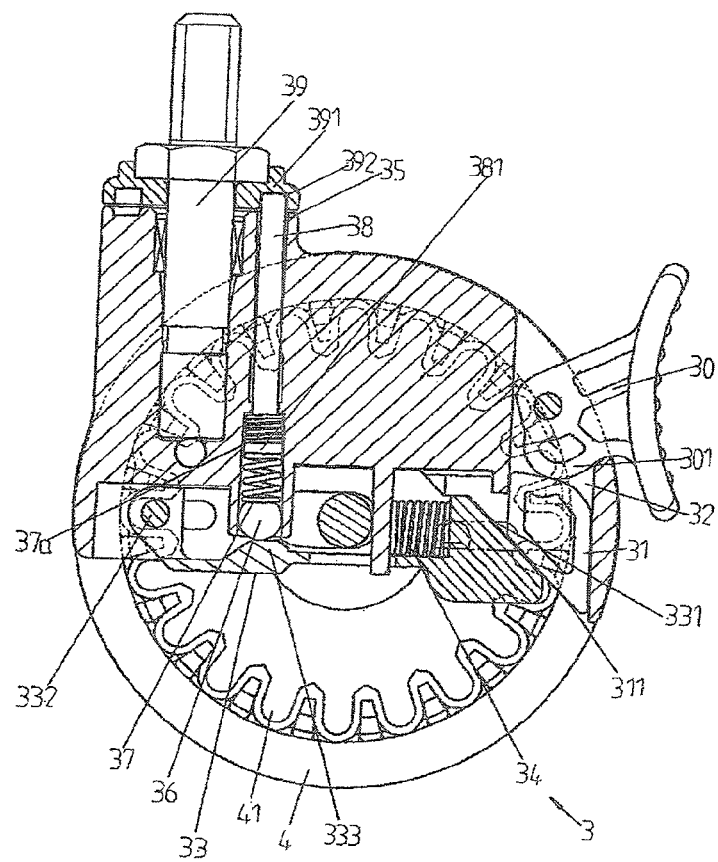
FIG. 12 is another cross sectional view showing the operation of the conventional double brake structure for the caster wheel.

Referring further to FIGS. 7-10, when the braking seat 17 presses downwardly, it rotates along the central post 13, and the tab 172 of the end portion 170 moves into the notch 163 of the fixing member 16, the fixing member 16 is pushed upwardly by a returning elasticity of the resilient element 18 so that the two engaging teeth 160 retain in two troughs 141 of two inner surfaces of the two rollers 14, hence the two rollers 14 are stopped. While the fixing member 16 moves upwardly to retain the two rollers 14, the locking piece 15 in the recessed trench 164 moves upwardly so that a top end of the fixing member 16 is located at a bottom end of the cover 12, and the retaining recess 150 limits a peripheral rib 120 of the cover 12, thus stopping the connecting shaft 12; while the braking seat 17 moves back to an original position upwardly, the fixing member 16 and the locking piece 15 move back to their original positions downwardly so that the two rollers 14 and the connecting shaft 11 roll and rotate again.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A double brake structure for a caster wheel comprising:

a body, a connecting shaft, a cover, a central post, two rollers, a locking piece, a fixing member, a braking seat, a resilient element, and a bottom cap; wherein the body includes a receiving hole to receive the connecting shaft, and a square hole is formed near the receiving hole to receive the locking piece, the body also includes a receiving chamber arranged on another side thereof so as to receive the braking seat, the receiving chamber communicates with an orifice of the body;

the locking piece includes a retaining recess defined on a top end thereof so as to engage with one of peripheral ribs of the cover to stop the connecting shaft;

the fixing member includes an engaging unit disposed on each of the two sides thereof, a through hole formed below the engaging unit so as to insert a peg of each of the two rollers, a flange arranged on a bottom portion of said fixing member, a notch next to the flange, and a recessed trench defined on one side thereof so as to position a bottom end of the locking piece;

the braking seat includes an opening formed on a first end thereof so as to inert the central post, a tab extending downwardly from the first end of the braking seat, and a pedal portion fixed on a second end of the braking seat;

the bottom cap includes a pore defined thereon and a circular indention formed on a central position of a top surface thereof so as to insert one end of the resilient element, wherein the connecting shaft is inserted into the receiving hole of the body via the cover so that the cover is covered on a top portion of the body, and the locking piece is inserted into the square hole of the body, and a bottom end of the locking piece is mounted in the recessed trench of the fixing member, so that the end portion of the braking seat is placed in the receiving chamber, and the first end of the braking seat is aligned with the orifice of the body, wherein the central post is inserted through the two through holes of the fixing member, the orifice of the body, and the opening of the braking seat to connect with the two rollers, and the two pegs of the two rollers are secured in the two through holes of the fixing member, wherein the braking seat is configured to rotate along the central post to drive the tab of first end to move into the notch of the fixing member, and the fixing member is pushed upwardly by a returning elasticity of the resilient element so that the two engaging units retain in two troughs of two inner surfaces of the two rollers to stop the two rollers; the fixing member moves upwardly to retain the two rollers, and the locking piece in the recessed trench moves upwardly so that a top end of the fixing member is located at a bottom portion of the cover, and the retaining recess limits the peripheral rib of the cover to stop the connecting shaft.

2. The double brake structure for the caster wheel as claimed in claim 1, wherein the end portion of the braking seat is placed in the receiving chamber, to align with the orifice of the body, hence the central post is inserted through the two through holes of the fixing member and the orifice of the body, and the opening of the braking seat to connect with the two rollers.

\* \* \* \* \*